No. 741,747. PATENTED OCT. 20, 1903.
M. J. WALZ.
NUT LOCK.
APPLICATION FILED JAN. 13, 1903.
NO MODEL.
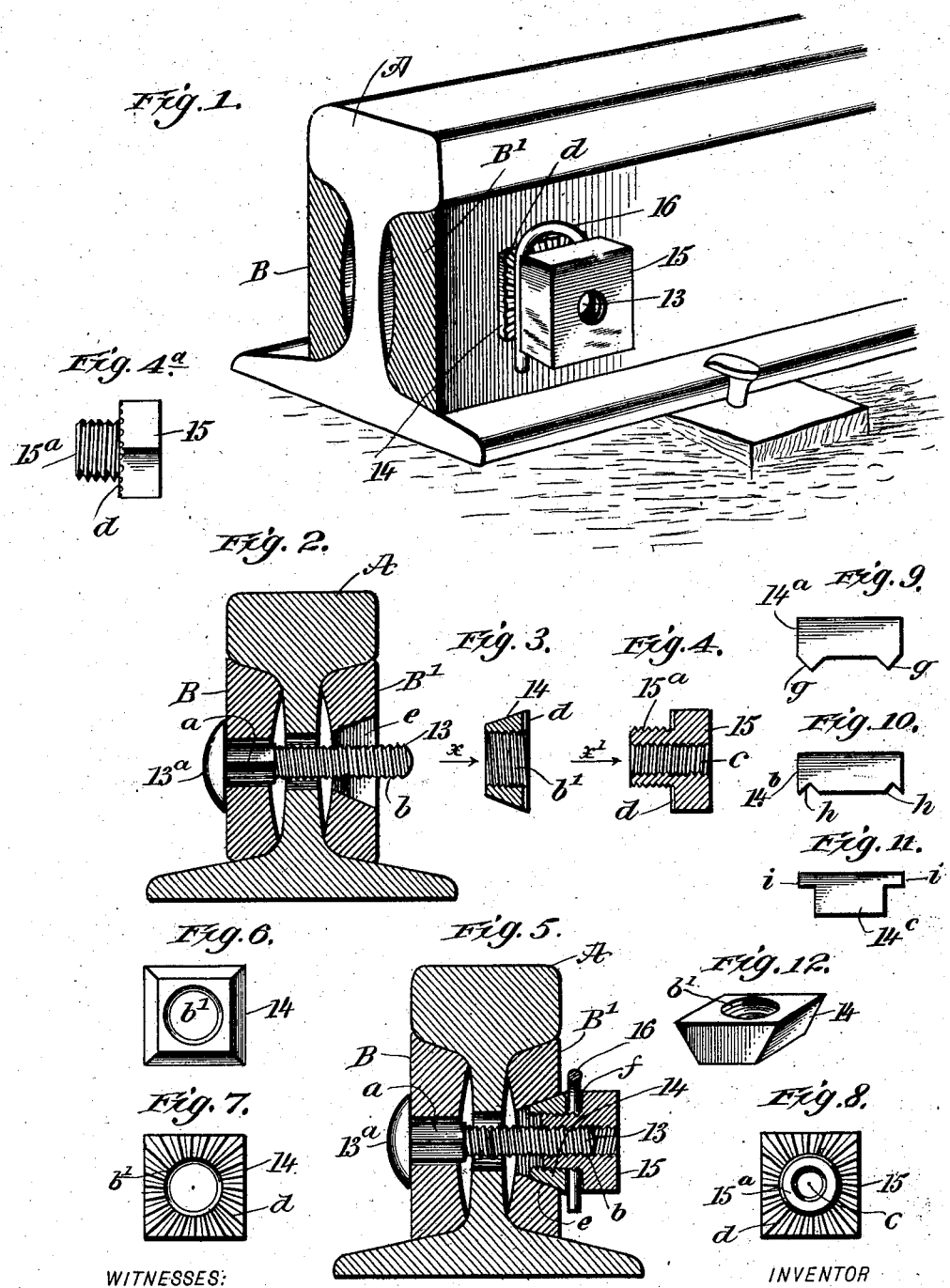
WITNESSES:
Paul Hunter
Wm P. Patton
INVENTOR
Michael J. Walz
BY
ATTORNEYS.

No. 741,747. Patented October 20, 1903.

UNITED STATES PATENT OFFICE.

MICHAEL J. WALZ, OF DEFIANCE, OHIO, ASSIGNOR OF ONE-HALF TO JOHN A. DEINDOERFER, OF DEFIANCE, OHIO.

NUT-LOCK.

SPECIFICATION forming part of Letters Patent No. 741,747, dated October 20, 1903.

Application filed January 13, 1903. Serial No. 138,892. (No model.)

*To all whom it may concern:*

Be it known that I, MICHAEL J. WALZ, a citizen of the United States, and a resident of Defiance, in the county of Defiance and State of Ohio, have invented a new and Improved Nut-Lock, of which the following is a full, clear, and exact description.

The object of this invention is to provide novel details of construction for a nut-lock that are simple, practical, very effective in operation, and adapted for general use to reliably hold a nut on a bolt for securing the bolt in place and preventing the loosening of the nut when tightened thereon.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of the invention applied upon a bolt for clamping two fish-plates upon a track-rail. Fig. 2 is a transverse sectional view of a track-rail, two fish-plates thereon, and a side view of a track-rail bolt passing through alined perforations in said parts. Fig. 3 is a sectional side view of the base-section of a two-part lock-nut embodying features of the invention. Fig. 4 is a sectional side view of the cap-section of the two-part lock-nut. Fig. 4ᵃ is a side view of the cap-nut shown in Fig. 4. Fig. 5 is a transverse sectional view of a track-rail and two fish-plates thereon, said plates being held in place by a transverse bolt and the improved nut-lock in secured adjustment on said bolt. Fig. 6 is an end view of the base-nut shown in Fig. 3 looking in direction of the arrow $x$ in said figure. Fig. 7 is an end view of the base-nut opposite that shown in Fig. 6. Fig. 8 is an end view of the cap-nut seen in the direction of the arrow $x'$ in Fig. 4. Fig. 9 is a side view of a slightly-modified construction of the base-nut. Fig. 10 is a side view of another modified construction of the base-nut. Fig. 11 is a side view of another modified form of the base-nut, and Fig. 12 is a perspective view of the preferred form of the base-nut.

The improved nut-lock is adapted for use with a suitable bolt to retain the bolt in place on mechanism of various characters where it is essential to retain the nut and bolt as adjusted thereon.

In the drawings that illustrate the construction and application of the improvement for retaining fish-plates clamped on a track-rail as one use for which the invention is well adapted, A indicates a track-rail of the usual form, and B B' two fish-plates that in service are held clamped upon two track-rails at their meeting ends by bolts and nuts. As shown at $a$ in Figs. 2 and 5, the clamping-bolt 13 is angular in its body near the head 13ᵃ and loosely passes through a corresponding angular hole in the fish-plate B until the bolt-head impinges upon the outer side of the fish-plate. The body of the bolt is threaded from the opposite end to the termination of the angular formation $a$, and said thread $b$ may with advantage be right hand, or, in other words, turn spirally from left to right throughout its length.

While it is to be understood that I may modify the form preferably given to the base-section of the two-part locking-nut that embodies features of the invention, it is here represented as applied in the preferred form and will be described in connection with other details of the improvement. The base-section 14, as shown in Figs. 3, 5, 6, 7, and 12, consists of a nut-block having four sides defined by right-angled corners, said sides sloping an equal degree from one end wall of the nut-block toward the other. The nut-block or base-section 14 is centrally perforated at $b'$, the diameter of such perforation being considerably greater than the diameter of the threaded body of the bolt 13, said perforation being threaded in its defining-wall oppositely to the pitch or trend of that of the thread $b$ on the bolt-body—as, for example, if a right-hand thread is formed on the bolt-body 13 the defining-wall of the perforation in the nut-block 14 must be furnished with a left-hand thread, as indicated in Figs. 3 and 5. The cap-section of the two-part locking-nut consists of an angular block 15, which may be four-sided, as shown in Figs. 1 and 8, and from one end of the same an integral cylindrical boss 15ª projects, having a thread formed on its periphery conforming with the thread formed in the nut-block 14, wherein it should be adapted for free screwed engagement. Centrally in the block 15 or the cap-section a threaded perforation c is formed, the diameter, pitch of the thread, and trend of the same permitting the said cap-section to be readily screwed upon the bolt-body 13.

The end of the nut-block or base-section 14 having the greatest area and which in service is adjacent to the end of the cap-section 15, from which the cylindrical threaded boss 15ª projects, is radially toothed, as shown at d, and said end wall on the cap-section 15 is similarly roughened. To enable the proper engagement of the base-section 14 with the fish-plate B', a perforation e, having inwardly-converged walls, is formed therein.

In the application of the improvement, the bolt 13 having been fully inserted through the alined openings in the fish-plates B B' and the intervening web of the rail A, the cap-section 15 is engaged with the base-section 14 by screwing the boss 15ª into the threaded perforation in said base-section until the serrated ends of these two sections impinge upon each other. Both of the nut-sections 14 15 are now together screwed on the bolt-body 13 until the smaller end of the base-section 14 enters the countersunk cavity e in the fish-plate B' and strikes its angular corners on the side walls of the cavity.

The contact of the base-section 14 on the fish-plate will prevent said base-section from rotating, and by continuing the turning movement in the same direction, holding the cap-section only, the boss 15ª on the latter will be unscrewed correspondingly, which will push the base-section 14 into the cavity e, thus locking the cap-section 15 and the base-section 14 from rotation.

A gap or crevice f is formed between the serrated end walls of the base-section 14 and cap-section 15 when they are adjusted to lock them on the bolt-body, and to prevent a reversed turning movement of the cap-section that would release the base-section a filling-piece 16, of rigid material, is introduced into said crevice, having proper thickness to produce a frictional contact of the filling-piece upon the roughened end walls of the parts 14 15.

The filling-piece 16 may be in the form of a furcated bar (represented in Figs. 1 and 5) or be given any other available shape which will permit it to be inserted between the sections 14 15 and removed when necessary. It will be seen that the insertion of the filling-piece 16 prevents the accidental release of the nut-sections 14 15 and jams the two-part nut against the rigid material in or upon which it is seated.

In order to adapt the improvement for effective service, it is necessary that the base-section 14 of the two-part nut be held from turning when it is nearly approached to the piece upon which it is to seat. Hence it is obvious that it is not material whether the base-section 14 is in the exact form shown and described or is modified in construction—as shown, for example, in Figs. 9, 10, and 11—so long as provision is made to at a proper time hold the base-section from rotating, so that it will be propelled by the cap-section.

In the modified form shown in Fig. 9 the base-section 14ª of the nut is formed with two or more ribs g, that project from the lower surface of the nut-block and are designed to seat in corresponding recesses formed in the material whereon the base-section is impinged when the two-part nut is in locked condition.

In Fig. 10 the base-section 14ᵇ is furnished with grooves h, that in service receive corresponding projections on the material that the clamping-bolt and two-part nut are to secure together, the result being the same as has been explained with regard to the base-sections 14 and 14ª.

In Fig. 11 the base-section 14ᶜ is reduced on two opposite sides or, if preferred, on four sides of the same, so as to leave laterally-extending flanges i. In this construction the reduced portion of the base-section 14ᶜ is designed to seat in a depression of similar dimensions adapted to loosely receive the lower portion of the base-section, this depression being formed in material that is to be held clamped on other material, such depression being essentially similar to the depression or cavity e in the fish-plate B'. Evidently the two-part nut embodying either of the modifications will be adapted for secured engagement with material to be clamped by the bolt whereon the nut is mounted, it being understood that the nut-block sections are roughened on adjacent surfaces for the retention of a filling-piece that is inserted between them.

The device is operative if the clamping-bolt is cut with a left-hand thread and the boss on the cap-nut section is provided with a right-hand thread; but it is preferred to use a bolt having a right-hand thread, as shown in the drawings, as this enables the employment of bolts in common use without any alteration, and therefore the boss 15ª is preferably furnished with a left-hand thread.

Having thus described my invention, I claim as new and desire to secure by Letters Patent—

1. The combination with a threaded bolt held against rotation, of a two-part nut, comprising an angular base-section adapted to enter and positively interlock with material engaged by the bolt, and having an opening therein threaded oppositely from the bolt-thread, and a cap-section having a laterally-projected boss threaded to engage with the opening in the base-section, said boss and cap-section having a central perforation that is threaded to receive the bolt-thread, and a filling-piece insertible between the nut-sections to prevent their rotation.

2. The combination with a bolt having a head, an angular formation near the head and a threaded cylindrical body, of a two-part nut comprising a base-section adapted to interlock with material engaged by the bolt and having an opening therein threaded oppositely from the bolt-thread, a cap-section, a laterally-projected cylindrical boss on said cap-section having a thread cut oppositely from the thread on the bolt and adapted to screw into the base-section, and a roughened formation on the adjacent ends of both of the nut-sections, the cap-section and boss thereon having a threaded central perforation receiving the threaded bolt-body.

3. The combination with a bolt having a head, an angular formation near the head and a threaded cylindrical body, of a two-part nut comprising a base-section having a plurality of sides that converge toward one end for interlocking engagement within a corresponding cavity in material through which the bolt passes, said base-section also having a central opening threaded oppositely from the thread on the bolt, a cap-section angular in its body and having a cylindrical boss projected from one end thereof, the boss having a thread cut to fit and screw into the threaded opening in the base-section, radial serrations on the adjacent ends of the nut-sections, which sections when adjusted to lock them on the bolt are separated between their serrated ends, and a filling-piece fitting between said roughened ends of the nut-sections to prevent a rotatable movement of either nut-section.

4. A nut-lock for a screw-bolt, embodying the following instrumentalities, viz: a base-section adapted to be held from rotation by engagement with material through which the bolt passes and having a threaded opening opposite in trend to the trend of the bolt-thread, a cap-section having a lateral boss externally threaded and adapted to screw into the base-section when rotated toward the operator, said boss and cap-section having an axial threaded perforation therein into which the bolt screws, whereby the two sections of the nut will move together when rotated to screw them on the bolt-body until the base-section contacts with the material, whereupon a continued rotation of the cap-section in the same direction propels the base-section into locked engagement with said material, unscrews the cap-section somewhat and produces a gap between the two nut-sections, a filling of rigid material when introduced into said gap holding both nut-sections from rotation.

5. A nut-lock, comprising a base-section having sides that converge toward one end, a threaded central opening therein, and a cap-section, angular in its body and having a cylindrical boss projected from one end thereof, said boss having an external thread adapted to screw into the base-section, the boss and cap-section having a central threaded perforation, the thread therein trending oppositely from that in the base-section, adjacent surfaces on the base and cap sections being roughened.

In testimony whereof I have signed my name to this specification in the presence of two subscribing witnesses.

MICHAEL J. WALZ.

Witnesses:
   TELLIS T. SHAW,
   EDWARD M. HUBBARD.